Sept. 9, 1952  S. M. CHRISTIAN  2,610,302
RADIATION INTENSITY METERING SYSTEM
Filed Sept. 14, 1950

INVENTOR
Schuyler M. Christian
BY
ATTORNEY

Patented Sept. 9, 1952

2,610,302

UNITED STATES PATENT OFFICE 2,610,302

RADIATION INTENSITY METERING SYSTEM

Schuyler Medlock Christian, Princeton, N. J., assignor to Radio Corporation of America, a corporation of Delaware Application September 14, 1950, Serial No. 184,873

10 Claims. (Cl. 250—83.6)

This invention relates generally to radiation intensity meters and more particularly to such meters that are portable on a person and are self-contained.

Briefly, the invention consists of the combination of an electroscope, an ionization chamber, a quantity of a radioactive isotope and a selective network of a plurality of resistors and capacitors which network is grounded to the walls of the meter or to ground. These elements of the invention are connected together such that the currents set up by the radiation from the radioactive isotope charge the electroscope and furnish the voltage for and absorb the discharge from the ionization chamber. The plurality of resistors and capacitors, in selected combinations, provide an adjustable drainage or leakage path from the electroscope to ground. When this leakage path is adjusted so that the charge on the electroscope remains constant, it is known that the currents generated by the radioactive isotope are equal to the currents discharged from the ionization chamber due to incident radiation and to the currents through the leakage network. By calibrating the meter for the various combinations of the resistors and capacitors, the intensity of the radiation to be measured is determined.

It will thus be seen, that the meter of this invention is an intensity radiation meter, rather than a dosimeter, and is capable of determining continuously, by the selection of combinations of the resistors and capacitors, the intensity of radiation received by the meter. For a more accurate determination of the intensity of radiation than is provided by a selection of capacitors and resistors of fixed values, the resistors or capacitors may be made variable.

The principal object of the invention is to provide a radiation intensity meter that indicates the presence and intensity of alpha, beta, gamma or X-ray radiations.

Another object of the invention is to provide such a meter that operates independently of any external source of electric potential.

Other objects and advantages of the invention will be apparent from the following detailed description made with reference to the accompanying drawings in which.

Figure 1:
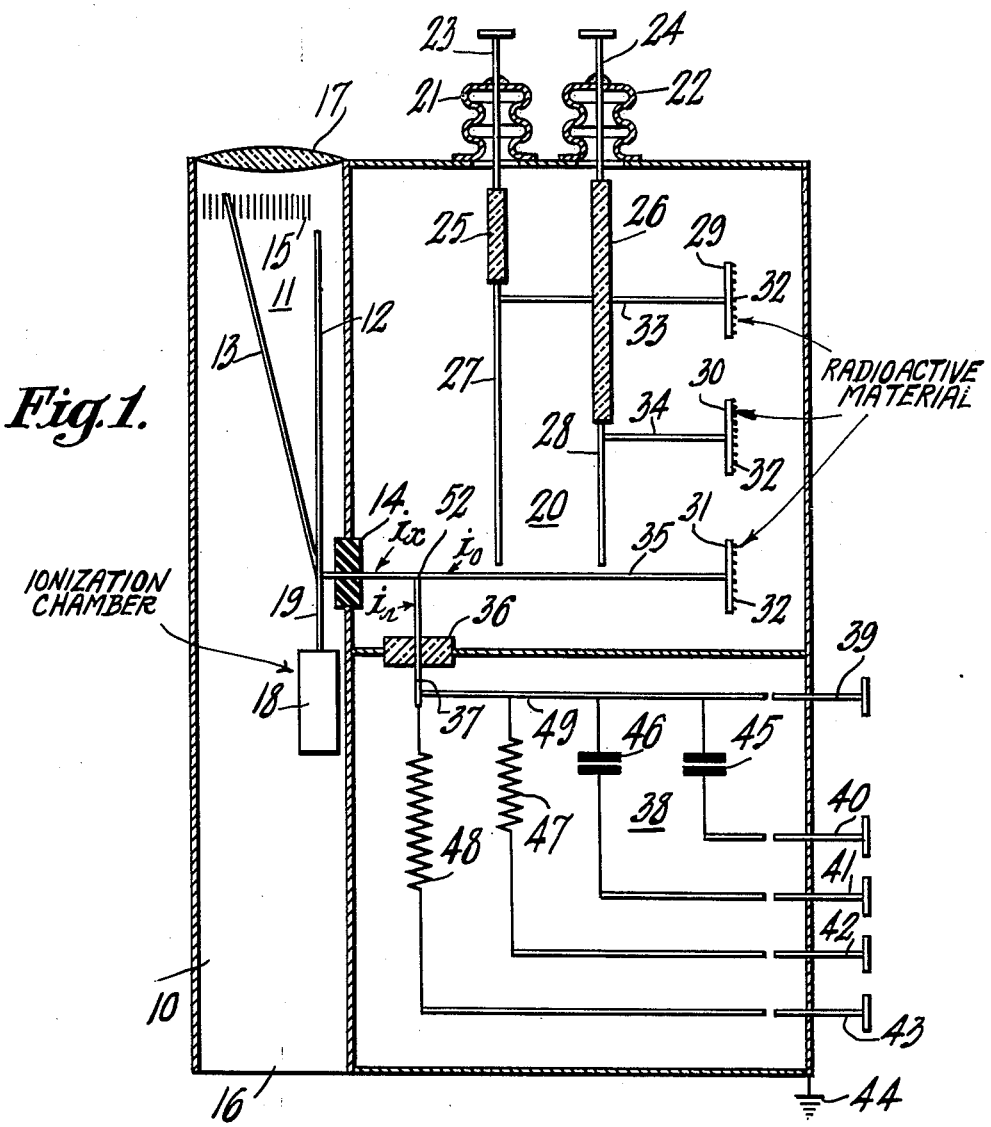
Figure 1 is a schematic view of one embodiment of the invention.

Referring to Figure 1, 10 is a hollow cylinder in the upper end of which is an electroscope, shown generally at 11. Electroscope 11 consists of a metal plate 12 and fiber 13, which may be of metal or metal-coated quartz. Plate 12 and fiber 13 are fastened together at their lower ends and are supported by insulating plug 14. Fiber 13 moves over scale 15 and indicates the electrical charge on the electroscope.

The lower end 16 of cylinder 10 is open and forms a window for light to pass through cylinder 16. A lens 17 is inserted in the upper end of cylinder 10 and focused on scale 15, to assist in observing the position of fiber 13 with reference to scale 15. Scale 15 may be calibrated in milliroentgens per hour.

An ionization chamber 18 is mounted in cylinder 10 and is connected by lead 19 to the joined ends of plate 12 and fiber 13 of electroscope 11.

Adjacent cylinder 10 is an evacuated chamber shown generally at 20. Sylphon bellows 21 and 22 form part of the walls of chamber 20, to provide vacuum tight movements of the handles 23 and 24 of two electric switches, which consist, respectively, of insulating sections 25 and 26 and contact rods 27 and 28.

Mounted in chamber 20 are a plurality of plates 29, 30 and 31 each of which supports a quantity of a beta emitting radio-active isotope 32. Plate 29 is connected to rod 27 by lead 33; plate 30 is connected to rod 28 by lead 34 and plate 31 is connected to electroscope 11 and ionization chamber 18 by lead 35. The lead 35 is so positioned in chamber 20 that when handles 23 and 24 are depressed, contact is made by rods 27 and 28 with lead 35.

Carbon 14, thallium 204 or nickel 63 are suitable radioactive isotope materials.

The walls of chamber 20 shield electroscope 11 and ionization chamber 18 from the radiation of the radioactive isotope 32.

In the lower wall of chamber 20 is insulating plug 36 through which passes lead 37 which is connected to lead 35. Lead 37 is connected to a network of capacitors and resistors in a chamber mounted adjacent cylinder 10 and shown generally at 38. The walls of chamber 38 are solid to form a hermetically sealed chamber, except for small opening for the handles of switches 39, 40, 41, 42 and 43, respectively, which are in contact with the walls of chamber 38. Chamber 38 may be grounded at 44.

In chamber 38 are mounted a plurality of capacitors, shown in the drawing as two, 45 and 46 and a plurality of resistors, shown in the drawing as two, 47 and 48. One side of each of capacitors 45 and 46 and resistors 47 and 48 are connected to lead 49, which is connected to lead 35. The other sides of capacitors 45 and 46 and resistors 47 and 48 are selectively connected through switches 40, 41, 42 and 43, respectively, to ground 44. Lead 49 may be grounded by switch 39. There is thus formed in chamber 38 a network of capacitors and resistors, and switches connected to the individual units of the network, whereby lead 37 may be directly grounded or may be grounded through selected units of the said network. As lead 37 is connected to lead 35 and, therefore, to electroscope 11 and ionization chamber 18, the network provides a selective variable path from ground to electroscope 11, ionization chamber 18 and lead 35.

Figure 2:
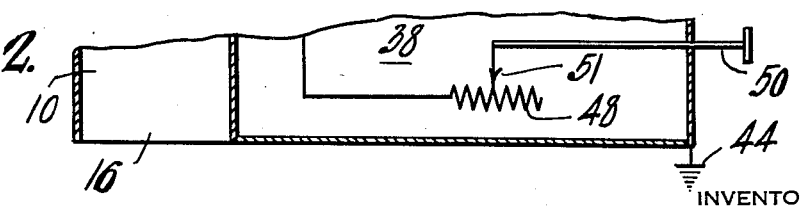
Figure 2 is a fragmentary schematic view of a modification of the invention showing a variable resistor substituted for a fixed resistor in Figure 1.

If a continuously variable grounded network is desired, one or more of the units in the said network may be made continuously variable by conventional slide-contact resistors and relatively sliding plates of capacitors. A conventional sliding contact resistor is shown in Figure 2 for resistor 48. Handle 50, grounded to the walls of chamber 38, moves contact 51 over the open ended turns of resistor 48. For a variable capacitor, handle 50 would be connected to a plate or one set of plates movable in relation to the other plate or other sets of plates of a capacitor.

In operation: With the emission of beta particles from isotopes 32, currents will flow towards and away from point 52, the point of joining leads 35 and 32 and the lead to the common point of connection between electroscope 11 and ionization chamber 18. There currents are designated, the charging current $i_o$, the drainage or leakage current $i_r$ and the discharge current $i_x$.

The emission of beta particles from isotope 32 charges the electroscope 11 to a voltage (V) according to the values of currents $i_x$. The values of currents $i_x$ depend upon the values of currents $i_o$ and $i_r$ and the currents flowing from ionization chamber 18 through lead 19 and the currents to charge the electroscope 11. The current flowing through lead 19 will depend upon the intensity of the radiation to be determined by the meter.

The values of currents $i_o$ may be adjusted by varying the amount of isotope 32 effective in the meter, by contacting rod 27 or rod 28 or both rods with lead 35.

The values of currents $i_r$ may be varied by opening or closing switches 39, 40, 41, 42 and 43.

If C is the capacitance of the total assembly of the meter and Q is the charge on electroscope 11, $$V = Q/C \qquad (1)$$

and $$Q = i_o t - i_x t - \int_0^t i_r dt \qquad (2)$$

where $t$ is the time for the charge on the electroscope to reach the value (V). The scale 15 may, therefore, be calibrated so that a voltage value (V) indicated by fiber 13, reached in time $(t)$, gives a value of (V) and hence a value of the radiation intensity to be determined.

Another system of calibration is to adjust the values of $i_o$ and the leakage resistance (R) of of the network in chamber 38 to a value such that the charge (V) on electroscope 11 remains constant. This condition is indicated by the fiber 13 remaining stationary at some definite point over scale 15. When this condition exists, $$i_o - i_x - V/R = O \qquad (3)$$

The values of $i_o$, $i_x$ V, C and R may be observed and/or calculated and their parameters adjusted to cover different ranges of radiation intensities to be determined. The meter may be easily calibrated by comparison of its readings when the meter is exposed to radiations of known intensities and the calibration may be printed on the meter for quick and easy reference.

It is, of course, apparent that for a wider range of intensity of radiation to be determined by the meter, the ranges of values of R, C and $i_o$ will have to be correspondingly increased. For narrow ranges of radiation intensity to be determined by the meter, less ranges of adjustment of the variables would be required.

There is thus disclosed a radiation meter in which the currents produced by a quantity of radioactive isotopes, balanced against the discharge current from an ionization chamber and a drainage current, are used to charge an electroscope to observed voltage values, the time to reach a predetermined voltage value or the adjustment of the said drainage currents such that the voltage value remains constant, being a measure of the intensity of the radiation being determined.

What I claim as my invention is:

1. In combination: an electroscope and an ionization chamber and electrode means including a quantity of a radioactive isotope connected to a common point and an impedance device connected between said common point and a point of reference potential with respect to said isotope.

2. In combination: an electroscope and an ionization chamber and electrode means including a plurality of quantities of a radioactive isotope connected to a common point and a variable network of impedance devices connected between said common point and ground.

3. In combination: an electroscope and an ionization chamber connected to a common point, a plurality of quantities of a radioactive isotope, means for selectively connecting said quantities to said common point and a variable network of capacitors and resistors connected between said common point and ground.

4. In combination: an electroscope having a plate and a fiber movable in proportion to the electrical charge on said electroscope, an ionization chamber connected to said fiber and said plate, electrode means including a quantity of radioactive material for charging said electroscope whereby said fiber is moved, means for indicating the extent of movement of said fiber, and means for draining said charge to ground.

5. In combination: an electroscope having a plate and a fiber movable in proportion to the electrical charge on said electroscope, an ionization chamber connected to said fiber and said plate, electrode means including a quantity of radioactive material for charging said electroscope whereby said fiber is moved, means for indicating the extent of movement of said fiber, and variable means for partially draining said charge to ground.

6. In combination: an electroscope having a plate and a fiber movable in proportion to the electrical charge on said electroscope, an ionization chamber connected to said fiber and said plate, electrode means including a quantity of radioactive material for charging said electroscope whereby said fiber is moved, means for indicating the extent of movement of said fiber, and variable resistance means for partially draining said charge to ground.

7. In combination: an electroscope and an ionization chamber and electrode means supporting a quantity of a radioactive isotope connected to a common point, a plurality of resistors, and means for selectively connecting said resistors between said common point and ground.

8. In combination: an electroscope and an ionization chamber and electrode means supporting a quantity of a radioactive isotope connected to a common point, a plurality of capacitors, and means for selectively connecting said capacitors between said common point and ground.

9. In combination: an electroscope having a plate and a fiber movable in proportion to the electrical charge on said electroscope, an ionization chamber connected to said fiber and said plate, electrode means including a quantity of radioactive material for charging said electroscope whereby said fiber is moved, means for indicating the extent of movement of said fiber, and means for varying the rate of movement of said fiber by said charging means.

10. In combination: a cylinder, an ionization chamber positioned in said cylinder, an electroscope consisting of a plate and a movable fiber and connected to said ionization chamber, a scale in said cylinder juxtaposed said fiber, a vacuum chamber adjacent said cylinder, a quantity of a radioactive isotope mounted in said chamber and shielded by the walls thereof, the said isotope being connected to said electroscope and said ionization chamber, a second chamber adjacent said cylinder, a plurality of resistors and a plurality of capacitors in said second chamber, and means for selectively connecting said resistors and said capacitors to said electroscope and to the walls of said second chamber.

SCHUYLER MEDLOCK CHRISTIAN.

REFERENCES CITED

The following references are of record in the file of this patent:

UNITED STATES PATENTS

| Number | Name | Date |
|---|---|---|
| 1,446,748 | Johnsen et al. | Feb. 27, 1923 |
| 1,748,386 | Loewe | Feb. 25, 1930 |
| 2,405,572 | Friedman | Aug. 13, 1946 |
| 2,465,886 | Landsverk et al. | Mar. 29, 1949 |

OTHER REFERENCES

"The Attainment of High Potentials by the Use of Radium," Moseley, Pro. of the Royal Society of London, vol. A88, pp. 471–476, 1913, Radioactive Digest.